United States Patent Office 3,492,369
Patented Jan. 27, 1970

3,492,369
GRAFT POLYMERIZING BY FIRST LITHIATING
IN THE PRESENCE OF POLAR COMPOUNDS
Floyd E. Naylor, Bartlesville, Okla., assignor to Phillips
Petroleum Company, a corporation of Delaware
No Drawing. Filed May 24, 1965, Ser. No. 458,487
Int. Cl. C08f 19/06; C08d 3/02
U.S. Cl. 260—879                16 Claims

ABSTRACT OF THE DISCLOSURE

Graft copolymers are produced by first metallating a backbone polymer made from at least one monomer of conjugated dienes or monovinyl-substituted aromatic compounds by contacting the backbone polymer with an organolithium compound in the presence of a polar compound to introduce lithium atoms along the backbone polymer chain and then contacting at least one monomer of conjugated diene and monovinyl-substituted aromatic compounds with the metallated backbone polymer to form the graft copolymer.

This invention relates to novel polymeric products and to a method for their preparation. In one aspect this invention relates to a new class of graft copolymers prepared by grafting vinyl aromatic compounds onto conjugated diene polymer backbones, thereby resulting in a graft copolymer which possesses an improved clarity and an unusually high impact strength. In another aspect this invention relates to a method for grafting a conjugated diene monomer onto a vinyl aromatic polymer backbone.

Conventional styrene homopolymers and copolymers are useful as molding resins; however, they do not exhibit sufficient impact strength for a great many applications. Some conventional polystyrene may exhibit somewhat higher impact strength at the sacrifice of other useful properties; however, these resins are soft and have low heat distortion temperatures. Impact strength commonly obtained with polystyrene ranges from about 0.2 to 0.5 foot-pound/inch notch.

It is, therefore, an object of this invention to provide a molding resin which has superior properties to those resins known under the prior art.

It is another object to provide a novel resin having a superior impact strength.

It is yet another object to provide a high impact molding resin having improved clarity.

It is a further object to provide a new high-impact strength resin which is hard and has a good heat resistance.

A still further object of this invention is to provide a method for preparing a graft copolymer wherein not only the molecular weight and structure of the backbone but also the molecular weight and structure of the graft can be regulated as desired.

A still further object of this invention is to provide a novel method for forming a graft copolymer wherein the impact strength, heat distortion, clarity, and flexural modulus properties of the graft copolymer can be regulated.

A still further object of this invention is to provide a method wherein styrene can be grafted upon a polybutadiene backbone at a plurality of sites along the backbone.

These and other objects of the invention will become more readily apparent from the following detailed description and discussion.

It has now been discovered that these and other objects may be accomplished by a novel grafting procedure which consists of metalating a polymer (in the absence of monomer) with an organolithium compound in the presence of a polar compound to produce carbanionic initiator sites along the polymer chain. These sites are then used to initiate the grafting of a monomer onto the polymer backbone. The polymer backbone is made from a monomer which is selected from the group consisting of conjugated dienes, vinyl aromatic compounds and mixtures thereof. (It is to be understood that this terminology includes homopolymers of both conjugated dienes and vinyl aromatic compounds and copolymers of mixtures of conjugated dienes and vinyl aromatic compounds and copolymers of conjugated dienes and vinyl aromatic compounds including alkyl substituted vinyl aromatic compounds.)

It has also been found that special graft copolymers having a backbone of conjugated diene polymer and vinyl aromatic polymer grafts unexpectedly possess superior properties, particularly as to clarity and impact strength. For example, these novel graft copolymers possess impact strengths above those of conventional polystyrene; in many cases these novel copolymers possess impact strengths higher than 9 foot-pounds/inch notch. Surprisingly, these superior properties such as clarity and improved impact strength are obtained without undue sacrifice in the other desired properties such as hardness and heat resistance.

For clarity throughout the specification and claims, the initial backbone polymer used in making the graft copolymers is referred to as the backbone polymer, and the monomers used in making the graft polymer chains are referred to as the grafting monomers.

Polymers suitable as backbone polymers are those which contain allylic and/or benzylic hydrogen. Such hydrogen is considered by those skilled in the art as being an active hydrogen. These polymers are capable of undergoing lithium-hydrogen interchange when brought into contact with organolithium according to the following equations:

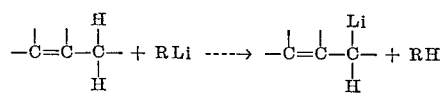

and

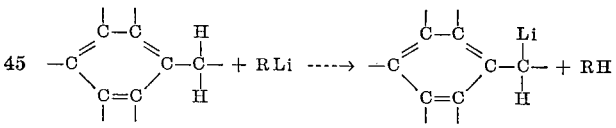

After this reaction has proceeded to the desired extent, a monomer for grafting is added and the reaction is continued.

The preferred backbone structure includes those polymers prepared from conjugated dienes having from 4 to 10 carbon atoms per molecule. Conjugated dienes preferred are butadiene and isoprene. The polymers of the following conjugated dienes have been found to make suitable backbones for obtaining the objects of the subject invention:

1,3-butadiene
isoprene
2,3-dimethyl-1,3-butadiene
1,3-pentadiene (piperylene)
2-methyl-3-ethyl-1,3-butadiene
3-methyl-1,3-pentadiene
3-methyl-1,3-pentadiene
2-methyl-3-ethyl-1,3-pentadiene
2-ethyl-1,3-pentadiene
1,3-hexadiene
2-methyl-1,3-hexadiene
1,3-heptadiene
3-methyl-1,3-heptadiene
1,3-octadiene
3,4-dimethyl-1,3-hexadiene 3-n-propyl-1,3-pentadiene
phenyl-1,3-butadiene
2,3-diethyl-1,3-butadiene
2,3-di-n-propyl-1,3-butadiene
2-methyl-3-isopropyl-1,3-butadiene In addition, copolymers, including both random and block copolymers, consisting of these conjugated dienes and vinyl-substituted aromatic compounds are suitable for incorporation in forming the backbone of our novel graft copolymers. Graft polymers prepared with a block copolymer backbone generally do not have as high impact strength as is obtained with a random backbone. In a preferred embodiment, it is an essential limitation of the backbone polymer that it possess a rubbery characteristic in order to obtain a graft copolymer having high impact strength. Therefore, the amount of conjugated diene present in a polymer backbone ranges from 40 to 100 parts by weight per 100 parts of total monomers. When the backbone is a block copolymer, the amount of vinyl aromatic compound can be as high as 60 parts by weight per 100 parts of total monomers. When the backbone is a block copolymer, the amount of vinyl aromatic compound can be as high as 60 parts by weight per 100 parts of total monomers. When the backbone is a random copolymer, at least 50 parts by weight per 100 parts of total monomers is conjugated diene. The inherent viscosity of these backbone polymers, whether they are homopolymers of a conjugated diene or a copolymer of a conjugated diene and a vinyl aromatic compound, is in the range of 0.5 to 5.0.

Temperatures suitable for the metalation reaction and for the graft polymerization step are in the range of 25–200° C., preferably 50° C. and higher. It is to be understood that temperatures outside this range are suitable. The reaction is conducted at a pressure sufficient for liquid phase operation. The time of the metalation reaction is dependent upon the temperature and the extent of metalation desired along the polymer backbone. However, it generally ranges from 2 minutes to 50 hours or more, as does the time for the graft polymerization step.

The vinyl aromatic compounds include styrene, 1-vinylnaphthalene, 2-vinylnaphthalene, and alkyl, cycloalkyl, aryl, alkaryl, and aralkyl derivatives thereof in which the total number of carbon atoms in the combined hydrocarbon substituents is not greater than 12. Examples of these compounds include:

3-methylstyrene (3-vinyltoluene)
3,5-diethylstyrene
4-n-propylstyrene
2,4,6-trimethylstyrene
4-dodecylstyrene
3-methyl-5-n-hexylstyrene
4-cyclohexylstyrene
4-phenylstyrene
2-ethyl-4-benzylstyrene
4-tolylstyrene
3,5-diphenylstyrene
2,4,6-tri-tert-butylstyrene
2,3,4,5-tetramethylstyrene
4-(4-phenyl-n-butyl)styrene
3-(4-n-hexylphenyl)styrene
4,5-dimethyl-1-vinylnaphthalene
2,4-diisopropyl-1-vinylnaphthalene
3,6-di-p-tolyl-1-vinylnaphthalene
6-cyclohexyl-1-vinylnaphthalene
4,5-diethyl-8-octyl-1-vinylnaphthalene
3,4,5,6-tetramethyl-1-vinylnaphthalene
3,6-di-n-hexyl-1-vinylnaphthalene
8-phenyl-1-vinylnaphthalene
5-(2,4,6-trimethylphenyl)-1-vinylnaphthalene
3,6-diethyl-2-vinylnaphthalene
7-dodecyl-2-vinylnaphthalene
4-n-propyl-5-n-butyl-2-vinylnaphthalene
5,8-dicyclopentyl-2-vinylnaphthalene
3-hexyl-7-phenyl-2-vinylnaphthalene
2,4,6,8-tetramethyl-1-vinylnaphthalene
3,6-diethyl-1-vinylnaphthalene
6-benzyl-1-vinylnaphthalene
3-methyl-5,6-diethyl-8-n-propyl-2-vinylnaphthalene
4-o-tolyl-2-vinylnaphthalene
5-(3-phenyl-n-propyl)-2-vinylnaphthalene and the like.

Any suitable temperatures can be employed in the formation of the polymer backbone and frequently a range of from about 0° C. to about 150° C. is used. Superatmospheric, atmospheric, and subatmospheric pressures may be used, as desired.

I have also determined that the formation of the backbone polymer can be carried out in the presence of a branching agent in order to obtain certain desired effects on properties of my graft copolymer. Compounds which are suitable as branching agents include divinylbenzene, chloroprene, vinylidene chloride, a nuclear halogen-containing styrene wherein at least one halogen substituent is present in a 2- or 4-position, a nuclear halogen-containing 1-vinylnaphthalene wherein at least one halogen constituent is present in a 2- or 4-position, a nuclear halogen-containing 2-vinylphthalene wherein at least one halogen substituent is present in a 1- or 3-position, polyepoxides, polyisocyanates, polyimines, polyaldehydes, polyketones, polyanhydrides, polyesters, polyhalides such as $SiCl_4$, and silanes. The only caution that must be followed in selecting the branching agent is that it should be present in a small amount in order to produce maximum branching and not leave any unreacted branching agent in the system to react with the organolithium metalating agent. The amount of branching agent ranges from 0 to 2 gram millimoles per hundred grams of monomer.

The metalating agent is limited to organolithium compounds. Organosodium and organopotassium compounds are unsuitable because they undergo chain transfer reactions. Primary and secondary alkyllithium compounds containing from 2–20 carbon atoms per molecule are suitable so long as they are soluble in the diluent. Preferred compounds are the n-alkyllithium compounds containing from 3–5 carbon atoms per molecule. Specific examples of these compounds include: ethyllithium, n-propyllithium, n-butyllithium, sec-butyllithium, n-amyllithium, n-hexyllithium, sec-dodecyllithium, and n-eicosyllithium. I will show hereinbelow that the amount of metalating agent employed in the metalation step controls the properties of the resulting graft copolymer and in general the amount of metalating agent will range from 0.5 to 175 gram millimoles per hundred grams of polymer backbone.

I have discovered that the metalation of the polymer backbone by the alkyllithium compound is substantially increased if the metalation of the backbone polymer occurs in the presence of a polar compound. This polar compound can be employed as the diluent, but it is preferred to dissolve the backbone polymer in a hydrocarbon diluent and add from 0.1–100, preferably 1 to 20, parts by weight of the polar compound per 100 parts by weight of the backbone polymer. Suitable polar compounds include tertiary amines and low molecular weight hydrocarbyl ethers such as: trimethylamine, tri-n-propylamine, methyldiethylamine, tri-n-butylamine, triethylamine, dimethylcyclohexylamine, N,N-dimethylaniline, N-methyl-N-ethylaniline, diethyl ether, ethyl n-propyl ether, diisopropyl ether, di-n-octyl ether, dibenzyl ether, diphenyl ether, tetrahydrofuran, and dioxane.

Hydrocarbons suitable for a diluent include paraffins, cycloparaffins, and aromatics having from 4–10 carbon atoms per molecular which include: butane, pentane, decane, cyclohexane, methylcyclohexane, benzene, and the like, and mixtures thereof.

Suitable graft monomers can be selected from those monomers described hereinabove in relation to the preparation of the backbone polymer; however, the preferred grafting monomers comprise a vinyl aromatic compound and include styrene, alkyl-substituted styrenes, and vinyl-naphthalenes. Styrene is particularly preferred as the grafting monomer for making high impact polystyrenes. The total amount of grafting monomer to backbone polymer in the graft copolymer ranges from 99:1 to 1:99, but preferably 99:1 to 70:30.

This novel method of forming a graft copolymer permits the control of the properties of the graft copolymer by regulation of the variables which include the inherent viscosity of the polymer backbone, the structure of the polymer backbone, the percent by weight of the polymer backbone in the grafted copolymer, the amount of branching which occurs in the polymer backbone, and the degree of metalation of the polymer backbone. The following Examples, I through IX, demonstrate a trend upon the physical properties, i.e., flexural modulus, hardness, tensile, elongation, impact, heat distortion and melt index, of my novel copolymer grafts when I vary any one of the above-identified variables. These trends are tabulated in the following examples, wherein the variables being varied are indicated in each example. The following definitions are applicable for Examples I through IX:

[a] Flexural modulus—p.s.i., determined in accordance with ASTM D-790-61.

[b] Izod impact—foot pounds per inch of notch, determined in accordance with ASTM D-256-54T, 1/8 inch-bar.

[c] Heat distortion, ° F. under 264 grams per square inch load.

[d] Melt index—grams of polymer extruded in 10 minutes at 200° C. under 5 kilogram weight through an orifice 0.315 inch long and 0.082 inch in diameter.

[e] Hardness, Shore Durometer, Type D—ASTM D-1706-61.

[f] Tensile, p.s.i. and elongation, percent—ASTM D-638-61T, samples drawn at rate of 0.2 inch per minute.

EXAMPLE I

A series of 16 runs was conducted on a graft copolymer having as a backbone a butadiene-styrene random copolymer wherein the butadiene was present in the amount of 70 parts by weight to 30 parts by weight of styrene to demonstrate the effect of varying the inherent viscosity of the polymer backbone upon the properties of the graft copolymer. The n-butyllithium available for metalation was maintained at 3.5 mhm. (mmoles per 100 grams of copolymer) for each of the 16 runs. For each inherent viscosity level a series of 4 runs was made in which the amount of copolymer backbone was varied from 16 percent by weight up to 22 percent by weight of the graft copolymer in 2 percent increments. The divinyl benzene was kept constant for all runs at 0.05 p.h.m., The values expressed in Table I represent the average value for each of the 4 runs conducted at each inherent viscosity level. These data demonstrate the effect of varying the inherent viscosity of the copolymer backbone on the elongation and impact strength of the resulting graft copolymer. Triethylamine is present during the metalation in the amount of 8 p.h.m.

TABLE I

| Inherent Viscosity | 2.48 | 3.17 | 3.23 | 3.61 |
|---|---|---|---|---|
| Flexural modulus, p.s.i.[a] | 290,000 | 287,000 | 277,000 | 285,005 |
| Hardness, Shore D [e] | 79 | 79 | 79 | 78.5 |
| Tensile, p.s.i.[f] | 4,064 | 4,648 | 4,145 | 4,210 |
| Elongation, percent [f] | 3 | 3.5 | 5.5 | 4.7 |
| Izod impact, notched [b] | 0.46 | 0.54 | 0.63 | 0.55 |
| Heat distortion, ° F.[c] | 189 | 199 | 191 | 188 |
| Melt index [d] | 0.04 | 0.07 | 0.12 | 0.08 |

See footnote references, col. 5.

EXAMPLE II

In like manner a series of 16 runs was conducted on a graft copolymer having as a backbone a butadiene-styrene random copolymer wherein the butadiene was present in the amount of 75 parts by weight to 25 parts by weight of styrene, to demonstrate the effect of varying the percent of copolymer backbone present in the graft copolymer. A series of 4 runs was made for each percentage level of backbone polymer present in the graft copolymer wherein the divinylbenzene employed in the making of the backbone polymer was varied from 0.0 to 0.15 mhm. in 0.05 increments, and the metallating agent, n-butyllithium, was varied from 3.0 to 4.5 mhm. in 0.5 increments. The values expressed in Table II represent an average of these 4 runs. It will be noted that flexural modulus, hardness and tensile strength decrease as the amount of backbone polymer is increased. Triethylamine is present during the metallation in the amount of 8 p.h.m.

TABLE II

| Backbone, Percent | 8 | 12 | 16 | 20 |
|---|---|---|---|---|
| Flexural modulus, p.s.i.[a] | 361,000 | 348,000 | 312,000 | 271,001 |
| Hardness, Shore D [e] | 83 | 82 | 79 | 78 |
| Tensile, p.s.i.[f] | 5,139 | 5,056 | 4,589 | 3,920 |
| Elongation, percent [f] | 7 | 8 | 9 | 8 |
| Izod impact, notched [b] | 0.45 | 0.45 | 0.51 | 0.50 |
| Heat distortion, ° F.[c] | 182 | 188 | 176 | 198 |
| Melt index [d] | 1.13 | 0.19 | 0.12 | 0.02 |

See footnote references, col. 6.

EXAMPLE III

A series of 16 runs was conducted on a graft copolymer having the same backbone as was employed in Example I. To demonstrate the effect of varying the amount of styrene monomer grafted upon such a backbone polymer, a series of 4 runs was conducted at each level of styrene monomer present in the copolymer graft in which the inherent viscosity of the backbone polymer was maintained at a level of 2.48, 3.17, 3.23, and 3.61, respectively. The n-butyllithium concentration was maintained constant at 3.5 mhm. and the divinylbenzene available for effecting branching in the copolymer backbone was maintained constant at 0.05 p.h.m. The values expressed in Table III represent the average of these four runs. It will be noted that increasing the amount of backbone increases the impact strength of the graft copolymer. Triethylamine is present during the metalation in the amount of 8 p.h.m.

TABLE III

| Backbone, Percent | 16 | 18 | 20 | 22 |
|---|---|---|---|---|
| Flexural modulus, p.s.i. | 303,000 | 295,000 | 279,000 | 261,000 |
| Hardness, Shore D [e] | 80 | 78 | 78 | 78.5 |
| Tensile, p.s.i.[f] | 4,231 | 4,481 | 4,261 | 4,100 |
| Elongation, percent [f] | 4 | 3.5 | 4.7 | 4.5 |
| Izod impact, notched [b] | 0.49 | 0.49 | 0.56 | 0.62 |
| Heat distortion, ° F.[c] | 189 | 191 | 188 | 192 |
| Melt index [d] | 0.07 | 0.06 | 0.18 | 0.06 |

See footnote references, col. 6.

EXAMPLE IV

In like manner a series of 16 runs was conducted on a graft copolymer having as a backbone a butadiene-styrene random copolymer wherein the butadiene was present in the amount of 75 parts by weight butadiene and the styrene was present in the amount of 25 parts by weight to demonstrate the effect of varying the concentration of butyllithium metalating agent upon the properties of the resulting graft copolymer. A series of 4 runs was conducted at each level of butyllithium concentration wherein the amount of styrene graft monomer was varied from 10 to 16 percent by weight in 2 percent increments. The divinylbenzene was maintained constant at 0.1 p.h.m. The values expressed in Table IV represent averages for each series of 4 runs. It will be noted that increasing the concentration of the butyllithium metalating agent increases the melt index of the graft copolymer. The triethylamine during the metalation was varied from 4 to 10 p.h.m. in 2 p.h.m. increments.

TABLE IV

| Butyllithium for Metalation, mhm | 3.0 | 3.5 | 4.0 | 4.5 |
|---|---|---|---|---|
| Flexural modulus, p.s.i.a | 326,000 | 317,000 | 326,000 | 304,000 |
| Hardness, Shore D e | 79 | 80 | 81 | 79 |
| Tensile, p.s.i. f | 5,633 | 5,622 | 5,262 | 3,626 |
| Elongation, percent f | 3.7 | 3.2 | 3.0 | 2.2 |
| Izod impact, notched b | 0.49 | 0.38 | 0.34 | 0.34 |
| Heat distortion, ° F.c | 195 | 196 | 193 | 188 |
| Melt index d | 0.0 | 0.69 | 4.01 | 16.4 |

See footnote references, col. 7.

EXAMPLE V

In like manner a series of 16 runs was conducted on a graft copolymer having a polybutadiene homopolymer backbone to demonstrate the effect of varying the amount of this backbone present in the graft copolymer. A series of 4 runs was conducted at each level of backbone polymer present in the graft copolymer in which the concentration of the n-butyllithium metalating agent was varied from 2.8 to 4.3 mhm. in 0.5 increments. The inherent viscosity of the backbone homopolymer was kept constant at 2.41 and the concentration of the divinylbenzene was maintained constant at 0.1 part by weight per 100 parts of butadiene. The values expressed in Table V represent an average for each series of 4 runs. Triethylamine is present during the metalation in the amount of 4 p.h.m.

TABLE V

| Backbone, Percent | 8 | 10 | 12 | 14 |
|---|---|---|---|---|
| Flexural modulus, p.s.i.a | 358,000 | 339,000 | 326,000 | 305,000 |
| Hardness, Shore D e | 81 | 79.5 | 77.5 | 77 |
| Tensile, p.s.i.f | 3,937 | 3,399 | 2,886 | 2,641 |
| Elongation, percent f | 1.8 | 2.0 | 3.0 | 1.8 |
| Izod impact, notched b | 0.28 | 0.31 | 0.34 | 0.32 |
| Heat distortion, ° F.c | 200 | 199 | 199 | 198.5 |
| Melt index d | 21 | 7.8 | 5.0 | 19 |

See footnote references, col. 7.

EXAMPLE VI

In like manner a series of 16 runs was conducted on a graft copolymer having a polybutadiene backbone to demonstrate the effect of varying the amount of divinylbenzene present in the preparation of the polybutadiene backbone. A series of 4 runs was conducted at each level of divinylbenzene in which the percentage of backbone in the graft copolymer was varied from 8 to 20 percent by weight in 4 percent increments and the concentration of the n-butyllithium metalating agent was varied from 3.0 to 4.5 mhm. in 0.5 increments. The values expressed in Table VI represent the average of each series of 4 runs. It will be noted that increasing the concentration of the divinylbenzene employed in the formation of the backbone effects the elongation, the impact strength and the melt index of the graft copolymer. Triethylamine is present during the metallation in the amount of 8 p.h.m.

TABLE VI

| Divinylbenzene, phm | 0.0 | 0.05 | 0.10 | 0.15 |
|---|---|---|---|---|
| Flexural modulus, p.s.i.a | 351,000 | 283,000 | 308,000 | 284,000 |
| Hardness, Shore D e | 77 | 76 | 77 | 76 |
| Tensile, p.s.i.f | 3,618 | 3,578 | 3,318 | 3,628 |
| Elongation, percent f | 2 | 2 | 3 | 4 |
| Izod impact, notched b | 0.35 | 1.94 | 1.06 | 2.38 |
| Heat distortion, ° F.c | 185 | 188 | 185 | 191 |
| Melt index d | 4.45 | 8.08 | 3.33 | 0.14 |

See footnote references, col. 7.

EXAMPLE VII

In like manner a series of 16 runs was conducted on a graft copolymer having as a backbone a polybutadiene homopolymer to demonstrate the effect of varying the amount of backbone polymer present in the graft copolymer. At each level of backbone copolymer present a series of 4 runs was conducted in which the concentration of n-butyllithium was varied from 3.0 to 4.5 mhm. in 0.5 increments. The divinylbenzene was varied from 0 to 0.15 p.h.m. in 0.05 increments. The values expressed in Table VII represent the average of each series of 4 runs. It will be noted that increasing the amount of polybutadiene backbone in the graft copolymer decreases the flexural modulus, hardness, tensile, and melt index, and increases the impact strength of the copolymer. Triethylamine is present during the metalation in the amount of 8 p.h.m.

TABLE VII

| Quality of Backbone Polymer, Percent | 8 | 12 | 16 | 20 |
|---|---|---|---|---|
| Flexural modulus, p.s.i.a | 345,000 | 341,000 | 286,000 | 253,000 |
| Hardness, Shore D e | 79 | 79 | 76 | 72 |
| Tensile, p.s.i.f | 4,676 | 3,782 | 3,217 | 2,857 |
| Elongation, percent f | 3.5 | 3 | 2.5 | 3 |
| Izod impact, notched b | 0.36 | 1.08 | 1.8 | 2.44 |
| Heat distortion, ° F.c | 189 | 188 | 188 | 186 |
| Melt index d | 12.7 | 2.06 | 1.69 | 1.62 |

See footnote references, col. 8.

EXAMPLE VIII

In like manner, a series of 16 runs was conducted on a graft copolymer having as a backbone a butadiene-styrene random copolymer to demonstrate the effect of varying the percentage of styrene present in the copolymer backbone. At each level of styrene present in the backbone a series of 4 runs was conducted wherein the concentration of the n-butyllithium was varied from 3.0 to 3.75 mhm. in 0.25 increments and the amount of backbone present in the resulting graft copolymer was varied from 15 to 24 percent in 3 percent increments. The divinylbenzene was maintained constant at 0.05 part per 100 parts of copolymer backbone. The values expressed in Table VIII represent the average for each series of runs. It will be noted that an increase in the amount of styrene present in the copolymer backbone increases the flexural modulus, tensile, and elongation, and decreases impact strength of the resulting copolymer. Triethylamine is present during the metalation in the amount of 8 p.h.m.

TABLE VIII

| Styrene in Backbone, Percent | 10 | 20 | 30 | 40 |
|---|---|---|---|---|
| Flexural modulus, p.s.i.a | 265,000 | 274,000 | 284,000 | 302,000 |
| Hardness, Shore D e | 78.5 | 78 | 77.5 | 81 |
| Tensile, p.s.i.f | 2,750 | 3,465 | 4,276 | 5,377 |
| Elongation, percent f | 2 | 2.2 | 3 | 3.8 |
| Izod impact, notched b | 0.58 | 0.48 | 0.42 | 0.38 |
| Heat distortion, ° F.c | 189 | 182 | 186 | 183 |
| Melt index d | 0.002 | 0.012 | 0.026 | 0.118 |

See footnote references, col. 8.

EXAMPLE IX

In like manner a series of 16 runs was conducted on a graft copolymer having as a backbone a butadiene-styrene random copolymer in which the butadiene is present in 75 parts by weight and the styrene is present in the amount of 25 parts by weight per 100 parts by weight of copolymer to demonstrate the effect of varying the amount of butyllithium available for the metalation step. A series of 4 runs was made at each level of concentration of butyllithium wherein the amount of polymer backbone present in the graft copolymer was varied from 8 to 20 percent by weight in 4 percent increments and the divinylbenzene was varied from 0.0 to 0.15 p.h.m. in 0.05 increments. The values expressed in Table IX represent an average of each of these series of 4 runs. It will be noted that an increase in the butyllithium concentration decreases the elongation and heat distortion properties of the resulting graft copolymer. Triethylamine is present during the metalation in the amount of 8 p.h.m.

TABLE IX

| Butyllithium for Metalation mhm | 3.0 | 3.5 | 4.0 | 4.5 |
|---|---|---|---|---|
| Flexural modulus, p.s.i.a.a | 349,000 | 314,000 | 320,000 | 302,000 |
| Hardness, Shore D e | 81 | 80 | 80 | 80.5 |
| Tensile, p.s.i.f | 5,025 | 4,323 | 4,973 | 4,793 |
| Elongation, percent c | 10 | 9.5 | 6 | 6 |
| Izod impact, notchedb | 0.50 | 0.57 | 0.44 | 0.41 |
| Heat distrotion, ° F.c | 191 | 190 | 186 | 186 |
| Melt index d | 0.21 | 0.67 | 0.29 | 0.41 |

See footnote references, col. 8.

In order to demonstrate more specifically the advantages of my novel process, I have presented the following examples as further specific illustration of my procedure.

EXAMPLE X

A run was conducted in order to demonstrate that a metalation reaction occurs between a butadiene/styrene block copolymer and n-butyllithium. The block copolymer had an inherent viscosity of 0.73, 80 percent unsaturation relative to polybutadiene, and was gel free. The recipe was as follows:

| | |
|---|---|
| 75/25 butadiene/styrene block copolymer, g. | 5 |
| Triethylamine, ml. | 50 |
| Isobutane, mmoles | 2 |
| n-Butyllithium, mmoles | [1] 10 |

[1] Added in two equal increments, one immediately following the other.

The dry polymer was charged first and triethylamine (dried over $CaH_2$) was added. After the polymer had dissolved in the amine, isobutane was introduced and then n-butyllithium (2.09 M in pentane). The several ingredients were mixed at 25° C. and the temperature was then adjusted to 70° C. for the metalation reaction.

A sample for scintillation counting was withdrawn immediately after mixing, prior to adjusting the temperature to 70° C., and other samples were obtained at intervals during the metalation reaction. Each sample was added to a sealed bottle containing sufficient tritiated alcohol to react with the butyllithium and polymer-lithium. The sample was then coagulated in isopropyl alcohol and dried in a vacuum oven at 60° C. One-half gram was dissolved in 15 milliliters of scintillator solution [1 liter of toluene, 4 grams of 2,5-diphenyloxazole, and 0.05 gram of 2,2'-p-phenylene-bis(5-phenyloxazole)], and counted on a Baird Atomic Model 245 Scintillation Counter. Counts per minute were translated to milliequivalents per 100 parts rubber of lithium-carbon bonds by calculations involving an internal standard. Results are presented in Table X.

TABLE X

| Sample | Time, Hours | Polymer-Lithium, mhr.,[1] percent of Theory[2] |
|---|---|---|
| A | 0 | 3.3 |
| B | 1 | 8.3 |
| C | 2 | 17.8 |
| D | 3 | 22.1 |

[1] Milliequivalents per 100 parts rubber.
[2] Allowance made for butane formed from reaction of impurities in system and butyllithium.

These data show that a regular increase in amount of polymer-lithium occurred during the three-hour period, thus indicating that the polymer was being metalated. The reaction was continued for a total of 20 hours and was then quenched with isopropyl alcohol. A check of butane gas before and after quenching indicated quantitative depletion of butyllithium. No butene was observed, indicating that butyllithium was not decomposed.

A study was conducted to observe the metalation reaction between n-butyllithium and two different polymers, polybutadiene and a butadiene/styrene block copolymer. The polybutadiene was prepared in cyclohexane at 50° C. using 4.0 mhm. n-butyllithium as the catalyst. The polymer had an inherent viscosity of 0.90 and was gel free. The following materials were charged to 7-ounce bottles:

| | 1 | 2 |
|---|---|---|
| Polybutadiene, grams | 5 | |
| Block copolymer, grams | | 5 |
| Triethylamine, ml. (dried over $CaH_2$) | 50 | 50 |
| Isobutane, mmoles | 2 | 2 |
| n-Butyllithium, mmoles | 10 | 10 |

The several ingredients were mixed at 25° C. Samples of the vapor phase were withdrawn and analyzed for n-butane by gas chromatography. The temperature was then increased to 70° C. Aliquots were taken at intervals and analyzed for n-butane by gas chromatography. Results are presented in Table XI.

TABLE XI

| | Time, Hours | Mmoles n-Butane | n-Butane from Metalation Reaction, mmoles | Increase in n-Butane percent of Theory |
|---|---|---|---|---|
| Polybutadiene: | | | | |
| A | 0 | 4.3 | 0 | 2 |
| B | 0.25 | 5.5 | 1.2 | 10 |
| C | 0.5 | 6.2 | 1.9 | 33 |
| D | 2.2 | 7.4 | 3.1 | 54 |
| E | 5.0 | 8.2 | 3.9 | 68 |
| Butadiene/Styrene Block Copolymer: | | | | |
| F | 0 | 4.5 | 0 | 0 |
| G | 0.2 | 5.5 | 1.0 | 18 |
| H | 0.67 | 5.8 | 1.3 | 24 |
| I | 2.25 | 7.7 | 3.2 | 58 |
| J | 5.2 | 7.6 | 3.1 | 56 |

Analyses in runs A and F were made immediately following mixing at 25° C. The amount of n-butane in each of these runs represents reaction with water and other impurities in the system (scavenger level). In runs B through E and G through J, conducted at 70° C., the millimoles of n-butane represents the scavenger level plus that from the metalation reaction. The n-butane from the metalation reaction is obtained by subtracting the scavenger level from each of these values. Since the amount of butyllithium charged was 10 millimoles, then 10−4.3, or 5.7 millimoles, represents the butyllithium available for metalation in runs B through E (also theoretical millimoles of n-butane). Similarly, 10−4.5, or 5.5 millimoles, represents the butyllithium available for metalation in runs G through J. The increase in butane, expressed as percent of theoretical, is calculated as follows:

$$\frac{\text{butane from metalation reaction}}{\text{theoretical mmoles of n-butane}} (100)$$

= increase in n-butane, percentage of theory

Calculations are illustrated for run B as follows:

$$\frac{1.2}{5.7}(100) = 21\%$$

EXAMPLE XI

A series of graft polymers was prepared and evaluated as electrical insulation stocks. Polybutadiene was prepared first, then metalated by reaction with n-butyllithium, and the metalated polymer was then reached with styrene to form a graft polymer. The following polymerization recipe was used.

| | |
|---|---|
| 1,3-butadiene, parts by weight | 100 |
| Cyclohexane, parts by weight | 900 |
| tert-Butyllithium (t-BuLi), mhm. | Variable |
| Lithium methylnaphthalene adduct solubilized with butadiene (LIMI-B), mhm | Variable |
| Temperature, ° C. | 50 |
| Time, hours | 6 |

Cyclohexane was charged first after which the reactor was purged with nitrogen. Butadiene was added followed by the catalyst. After a 6-hour polymerization period (polymerization complete), the reactions were shortstopped with isopropyl alcohol. Triethylamine and n-butyllithium were added to the reaction mixtures. The metalation reaction was conducted at 65° C. for 18 hours. Styrene was then added for the graft polymerization step. The temperature was maintained at 65° C. Reaction time for this step was one hour for the first run and two hours for the other runs. The reactions were shortstopped with a solution of 2,2'-methylene-bis(4-methyl-6-tert-butylphenol) antioxidant in a 50/50 volume mixture of isopropyl alcohol and toluene, the amount used being sufficient to provide approximately one part by weight of the antioxidant per 100 parts rubber. The polymers were coagulated in isopropyl alcohol, separated and dried. Data are presented in Table XII.

TABLE XII

|  | 1 | 2 | 3 | 4 |
|---|---|---|---|---|
| *Polymerization Data* | | | | |
| tert-Butyllithium, mhm | 1.32 | 1.6 | | |
| LIMI-B, mhm | | | 1.4 | 1.4 |
| Triethylamine, p.h.m | 20 | 20 | 20 | 20 |
| n-Butyllithium, mhm | 10 | 10 | 5 | 10 |
| Styrene, p.h.m | 33.3 | 33.3 | 33.3 | 33.3 |
| Styrene conversion, percent | 89 | 100 | 100 | 100 |
| Raw ML-4 at 212° F | 57 | 20 | 29 | 42 |
| Inherent viscosity | 1.25 | 1.02 | 1.28 | 1.16 |
| *Compounding Recipe, Parts by Weight* | | | | |
| Polymer | 100 | 100 | 100 | 100 |
| Zinc oxide | 10 | 10 | 10 | 10 |
| Stearic acid | 10 | 10 | 10 | 10 |
| Agerite Stalite [1] | 1.5 | 1.5 | 1.5 | 1.5 |
| Dixie Clay [2] | 100 | 100 | 100 | 100 |
| Purecal O [3] | 50 | 50 | 50 | 50 |
| Cumar MH 2½ [4] | 15 | 15 | 15 | 15 |
| Sulfur | 2 | 2 | 2 | 5 |
| Altax [5] | 1.5 | 1.5 | 1.5 | 1.5 |
| Methyl Zimate [6] | 0.5 | 0.5 | 0.5 | 0.2 |
| *Physical Properties, Cured 30 Minutes at 307° F.* | | | | |
| Compression set, percent [a] | 34.0 | 51.5 | 63.5 | 39.9 |
| 200% Modulus, p.s.i. [b] | 1,050 | 820 | 800 | 890 |
| Tensile, p.s.i | 1,070 | 990 | 1,090 | 1,170 |
| Elongation, percent | 205 | 370 | 430 | 405 |
| Tear resistance, lb./in. [c] | 230 | 205 | 200 | 195 |
| Shore A hardness [d] | 88.5 | 88.5 | 91 | 88.5 |
| *Oven Aged 24 Hours at 212° F.* | | | | |
| 200% Modulus, p.s.i | | 1,250 | 1,230 | 1,340 |
| Tensile, p.s.i | 1,450 | 1,410 | 1,400 | 1,510 |
| Elongation, percent | 180 | 300 | 270 | 280 |

[1] Octylated diphenylamine.
[2] Hard-type, white-to cream'colored kaolin (aluminum silicate); specific gravity 2.60.
[3] Chemically precipitated CaCO₃; particle size 0.15–0.30 micron; specific gravity 2.65.
[4] Polymers of indene, coumarone, and associated coal tar compounds; melting point 115–125°C.; ash (maximum) 0.5% specific gravity 15.5 C/15.5 C, 1.130.
[5] Benzothiazyl disulfide.
[6] Zinc dimethyldithiocarbamate.
[a] Compression set: ASTM D 395-61, Method B (modified). Compression devices are used with 0.325 inch spacers to give a static compression for the 0.5 inch pellet of 35 percent. Test is run for 2 hours at 212° F. plus relaxation for 1 hour at 212° F.
[b] 200% Modulus, psi; Tensile, psi; and Elongation, %—ASTM D 412-61T. Scott Tensile Machine L-6. Tests made at 80° F. unless otherwise designated.
[c] Tear resistance: ASTM D 624-54. Die A.
[d] Shore A hardness: ASTM D 1706-61. Shore Durometer, Type A.
P.h.m.=parts by weight per 100 parts monomer.

The graft polymers exhibited a fairly high cure rate and reasonably good properties for electrical insulation stocks.

EXAMPLE XII

A series of runs was made for the production of high impact polystyrene by grafting styrene onto a metalated butadiene-styrene random copolymer prepared in the presence of divinylbenzene to produce branching in the backbone copolymer. The following recipe was used:

| | |
|---|---|
| 1,3-butadiene (Bd), grams | Variable |
| Styrene (St), grams | Variable |
| Cyclohexane, grams | 400 |
| Divinylbenzene (DVB), grams | Variable |
| n-Butyllithium (BULi), mmoles [1] | Variable |
| Triethylamine, grams | 4 |
| Temperature, °C. | 50 |
| Time, hours | 6 |

Methalation recipe

| | |
|---|---|
| Butadiene-styrene random copolymer, g. | Variable |
| n-Butyllithium, mmoles | Variable |
| Temperature, °C. | 65 |
| Time, hours | 16–18 |

[1] Assumed that 0.5 mmole of the butyllithum added serves as the scavenger.

Cyclohexane was charged first after which the reactor was purged with nitrogen. Butadiene was added followed by the styrene, divinylbenzene, triethylamine, and butyllithium, in the order named. After a 6-hour polymerization period, quantitative conversion had been reached and butyllithium for the metalation reaction was added. About 16.5 to 17 hours were allowed for this step. Styrene employed for the graft polymerization step was introduced in increments over a 1.5 to 2.0 hour period to avoid an excessive heat surge. After all the styrene was added, a period of two hours at 50° C. was allowed for the grafting step. The reactions were shortstopped and the products recovered as in Example XI. Various physical properties were determined. The amounts of ingredients charged are given in Table XIII. The ratio of the monomers (including divinylbenzene) used in the first step was held constant as was the butyllithium concentration. Also the total amount of monomers including the styrene used in the graft polymerization step was the same in all runs. Physical properties of the graft polymers are presented in Table XIV.

TABLE XIII

| | Polymerization Recipe | | | | Metalation, BuLi, mmoles | Grafting, Styrene, g. |
|---|---|---|---|---|---|---|
| Run No. | Bd, g. | St, g. | DVB, g. | BuLi, mmoles | | |
| 1 | 16 | 5.33 | 0.032 | 0.609 | 2.0 | 78.7 |
| 2 | 18 | 6.0 | 0.036 | 0.623 | 2.0 | 76 |
| 3 | 22 | 7.33 | 0.044 | 0.650 | 2.0 | 70.7 |
| 4 | 24 | 8.0 | 0.048 | 0.664 | 2.0 | 68 |
| 5 | 14 | 4.67 | 0.028 | 0.596 | 2.5 | 81.3 |
| 6 | 20 | 6.67 | 0.040 | 0.637 | 2.5 | 73.3 |
| 7 | 22 | 7.33 | 0.044 | 0.650 | 2.5 | 70.7 |
| 8 | 24 | 8.0 | 0.048 | 0.664 | 2.5 | 68 |
| 9 | 10 | 3.3 | 0.020 | 0.568 | 3 | 86.7 |
| 10 | 12 | 4.0 | 0.024 | 0.582 | 3 | 84 |
| 11 | 16 | 5.3 | 0.032 | 0.609 | 3 | 78.7 |
| 12 | 18 | 6.0 | 0.036 | 0.623 | 3 | 76 |
| 13 | 20 | 6.7 | 0.040 | 0.637 | 3 | 73.3 |
| 14 | 16 | 5.3 | 0.032 | 0.609 | 5 | 78.7 |
| 15 | 18 | 6.0 | 0.036 | 0.623 | 5 | 76 |
| 16 | 22 | 7.3 | 0.044 | 0.650 | 5 | 70.7 |
| 17 | 24 | 8.0 | 0.048 | 0.664 | 5 | 68 |

TABLE XIV

| Run No. | Flexural Modulus, p.s.i. | | Shore D Hardness | | Tensile at Break, p.s.i. | | Elongation, percent | | Izod Impact, ft. lbs./in. notch | Heat Distortion, °F. |
|---|---|---|---|---|---|---|---|---|---|---|
| | Original | Milled [1] | Original | Milled [1] | Original | Milled [1] | Original | Milled [1] | | |
| 1 | 261,000 | | 77 | | 3,207 | | 3 | | 3.33 | |
| 2 | 247,000 | | 76 | | 2,983 | | 4 | | 4.24 | |
| 3 | 198,000 | | 75 | | 2,540 | | 4 | | 5.79 | |
| 4 | 200,000 | | 70 | | 2,473 | | 5 | | 7.65 | |
| 5 | 252,000 | | 77 | | 2,300 | | 1 | | 2.40 | |
| 6 | 215,000 | | 74 | | 2,410 | | 3 | | 5.06 | |
| 7 | 166,000 | | 72 | | 1,640 | | 2 | | 8.70 | |
| 8 | 106,000 | | | | 1,122 | | 9 | | 9.54 | |
| 9 | 311,000 | 327,000 | 81 | 78 | 3,677 | 3,427 | 2 | 1 | 1.41 | 195 |
| 10 | 282,000 | 306,000 | 79 | 78 | 2,487 | 2,308 | 1 | 1 | 3.27 | 174 |
| 11 | 282,000 | 296,000 | 77 | 79 | 2,610 | 5,230 | 2 | 4 | 3.24 | 182 |
| 12 | 212,000 | 224,000 | 74 | 75 | 2,860 | 3,277 | 3 | 2 | 9.00 | 176 |
| 13 | 180,000 | 208,000 | 71 | 75 | 2,085 | 3,473 | 7 | 4 | 9.10 | 171 |
| 14 | 209,000 | | 75 | | 2,160 | | 1 | | 2.08 | 173 |
| 15 | 183,000 | | 73 | | 1,807 | | 2 | | 2.70 | 171 |
| 16 | 125,000 | | 68 | | 1,195 | | 3 | | 2.95 | 165 |
| 17 | 91,000 | | 63 | | 987 | | 12 | | 8.32 | 158 |

[1] Tests rerun after samples were milled about two minutes on a 2-inch roll mill at 300° F.

EXAMPLE XIII

A series of graft polymers described in Table XV was prepared according to the procedure described in Example XI. The copolymers used for the polymer backbone were all random copolymers. Each run number describes a particular graft copolymer composition and the properties which it possessed. These runs are presented to demonstrate individual graft copolymers having a relatively good balance of properties relating to clarity, melt index, heat distortion, impact strength, tensile, elongation, hardness, and flexural modulus.

It is quite evident from the data presented that the polymers produced by this novel process can be varied widely in physical properties. They range from clear, medium impact plastics to very tough, high impact polymers displaying excellent heat distortion values (180–200° F.), high hardness, high flexural modulus (250–350M p.s.i.), and high tensile strength (3000–6000 p.s.i.). They can also be hot drawn several hundred percent to produce very strong oriented film and fiber-like materials. These copolymers have excellent utility in refrigerator door liners, automobile dashboards, pipes, drinking glasses, tumblers, cereal and soup dishes, tea and coffee cups, plates and saucers knife handles, and a host of other such uses.

EXAMPLE XIV

Runs were made to demonstrate the advantage in conducting the metalation reaction in the presence of a polar compound. Materials were charged in the following proportions:

|  | 1 | 2 |
|---|---|---|
| Cyclohexane, ml | 480 | 480 |
| n-Butyllithium, mmoles | 2.8 | 2.8 |
| Polybutadiene, grams | 7.4 | 7.0 |
| Triethylamine, grams |  | 5.6 |

The polybutadiene employed was a rubbery polymer prepared by the polymerization of butadiene in the presence of n-butyllithium. The several ingredients were mixed at 30° C. and samples of the vapor phase were withdrawn and analyzed for n-butane by gas chromatography. The values obtained represented the scavenger level. The temperature was then increased to 70° C. for the metalation reaction and vapor phase samples were again analyzed for n-butane. A sample from each run was hydrolyzed to determine the total amount of n-butane that could be obtained. Results were as follows:

|  | 1 | | | 2 | | |
|---|---|---|---|---|---|---|
|  | Time, Hours | n-Butane, Mmoles | Metalation, percent [3] | Time, Hours | n-Butane, Mmoles | Metalation, percent [3] |
|  | [1] 0.75 | 0.72 | 0 | [1] 1 | 0.55 | 0 |
|  | 16 | 1.2 | 25 | 5 | 0.9 | 20 |
|  | 21 | 1.4 | 36 | 22 | 1.9 | 77 |
| Total n-butane by hydrolysis |  | 2.6 |  |  | 2.3 |  |
| Total n-butane possible from metalation [2] |  | 1.88 |  |  | 1.75 |  |

[1] Analysis made before temperature increased to 70° C.
[2] Run 1: 2.6−0.72=1.88. Run 2: 2.3−0.55=1.75.
[3] Run 1, 16 hrs.: $\frac{1.2-0.72}{1.88}(100)=25$
Run 1, 21 hrs.: $\frac{1.4-0.72}{1.88}(100)=36$
Similar calculations for Run 2.

These data show that metalation occurred at a much more rapid rate when a polar compound was present.

It is to be understood that antioxidants, dyes, fillers, pigments, plasticizers, curatives, and similar ingredients, which are conventionally added to polymers of this type, can be incorporated in the graft polymers prepared according to this invention.

It will be evident to those skilled in the art that the invention can be practiced other than as specifically taught on consideration of the foregoing disclosure. Such variations and modifications are believed to be within the skill and the scope of the present invention as defined in the following claims.

I claim:

1. In a process for producing graft copolymers comprising metallating a hydrocarbon polymer selected from the group consisting of homopolymers of conjugated dienes, homopolymers of monovinyl-substituted aromatic compounds and copolymers of conjugated dienes and monovinyl-substituted aromatic compounds and copolymers of conjugated dienes and monovinyl-substituted aromatic compounds by contacting said polymer with a primary or secondary alkyllithium compound, the improvement comprising increasing the rate of the reaction of the lithium compound with the polymer by conducting the reaction in the presence of a polar compound selected from the group consisting of tertiary amines and low molecular weight hydrocarbyl ethers to form a backbone polymer having active lithium atoms along the polymer chain, and thereafter contacting at least one monomer selected from the group consisting of conjugated dienes,

TABLE XV

| Sample | Run No. 1 | Run No. 2 | Run No. 3 | Run No. 4 | Run No. 5 | Run No. 6 | Run No. 7 | Run No. 8 |
|---|---|---|---|---|---|---|---|---|
| Flex. Mod | 334,000 | 375,000 | 344,000 | 241,000 | 224,000 | 228,000 | 309,000 | 347,000 |
| Hardness, Shore D | 81 | 84 | 82 | 75 | 71 | 77 | 80 | 83 |
| Elong., percent | 13 | 6 | 12 | 3 | 2 | 2 | 4 | 3 |
| Tensile, p.s.i. | 4,080 | 5,583 | 4,577 | 2,790 | 2,827 | 1,940 | 5,697 | 6,120 |
| Izod impact, ft. lbs./in. notch | 0.64 | 0.40 | 0.53 | 5.56 | 6.09 | 0.71 | 0.39 | 0.39 |
| Heat dist., °F | 181 | 191 | 188 | 190 | 187 | 189 | 188 | 197 |
| Melt index | 2.41 | 0.46 | 0.20 | 0.16 | 0.48 | 0.0 | 0.05 | 0.01 |
| Clarity | ([1]) | ([2]) | ([2]) | ([3]) | ([3]) | ([4]) | ([2]) | ([5]) |
| Backbone | 75/25 Bd-Sty | 75/25 Bd-Sty | 75/25 Bd-Sty | Polybd | Polybd | 90/10 Bd-Sty | 70/30 Bd-Sty | 75/25 Bd-Sty |
| Rubber | 8 | 8 | 12 | 16 | 20 | 24 | 18 | 10 |
| BuLi for Met, phr | 3.5 | 3.0 | 3.5 | 4.5 | 4.0 | 4.75 | 4.75 | 3.5 |
| DVB, parts by wt | 0.15 | 0.0 | 0.0 | 0.15 | 0.05 | 0.05 | 0.05 | 0.10 |
| Inherent visc. of rubber | 3.05 | 2.24 | 2.24 | 3.98 | 2.73 | 1.18 | 1.38 | 2.50 |
| Gel, wt., percent | 0 | 0 | 0 | 0 | 0 | 0 | 0 | 0 |

[1] Translucent to transparent. [2] Transparent. [3] Opaque. [4] Translucent. [5] Very transparent.

vinyl aromatic compounds and mixtures thereof with the metallated backbone polymer to form a graft copolymer.

2. A process as defined in claim 1 wherein the polar compound is triethylamine.

3. The process according to claim 1 wherein said polymer is a copolymer of butadiene and styrene containing butadiene in an amount ranging from 40 to 90 parts by weight and styrene in an amount ranging from 60 to 10 parts by weight, both based on 100 parts of said copolymer, and said monomer contacted with said metallated backbone polymer is styrene.

4. A process as defined in claim 1 wherein the backbone is a block copolymer consisting of butadiene-styrene in which the butadiene is present in the amount of 60 parts by weight and the styrene is present in the amount of 40 parts by weight per 100 parts of backbone.

5. The process according to claim 1 wherein said polymer is polybutadiene and said monomer contacted with said metallated backbone polymer is styrene.

6. The process according to claim 1 wherein the amount of said organolithium compound is 0.5 to 175 gram millimoles per 100 grams of said backbone polymer and the amount of said polar compound is 0.1 to 100 parts by weight per 100 parts by weight of said backbone polymer.

7. The process according to claim 6 wherein said organolithium compound is n-butyllithium.

8. The process according to claim 6 wherein said metallating step is performed at a temperature in the range of 25 to 200° C. for a period of 2 minutes to 50 hours.

9. The process according to claim 1 wherein said hydrocarbon polymer is prepared by polymerizing at least one monomer selected from the group consisting of conjugated dienes and monovinyl-substituted aromatic compounds selected from the group consisting of styrene, 1-vinylnaphthalene, 2-vinylnaphthalene, and alkyl, cycloalkyl, alkaryl, and aralkyl derivatives thereof with the total number of carbon atoms in the combined hydrocarbon substituents being 12 or less, with an organolithium compound.

10. The process according to claim 9 wherein said polymerizing is carried out in the presence of a branching agent selected from the group consisting of divinylbenzene, chloroprene, vinylidene chloride, and silicon tetrachloride, the amount of said branching agent being 0 to 2 milligrams per 100 grams of said monomer.

11. A process as defined in claim 10 wherein the branching agent is divinylbenzene.

12. A process as defined in claim 9 wherein the polar compound is triethylamine.

13. A process as defined in claim 9 wherein the organolithium metallating compound is n-butyllithium.

14. The process according to claim 9 wherein said organolithium compound for both polymerization and metallation steps in n-butyllithium.

15. The process according to claim 9 wherein said monomers polymerized to form said backbone polymer are 1,3-butadiene and styrene and said monomer contacted with said metallated backbone polymer is styrene.

16. The process according to claim 9 wherein said monomer polymerized to form said backbone polymer is 1,3-butadiene and said monomer contacted with said metallated backbone polymer is styrene.

References Cited

UNITED STATES PATENTS

| | | | |
|---|---|---|---|
| 2,754,282 | 7/1956 | Stoops et al. | 260—880 |
| 2,957,833 | 10/1960 | Baum | 260—880 XR |
| 3,029,221 | 4/1962 | Welch. | |
| 3,055,860 | 9/1962 | Baer et al. | 260—886 XR |
| 3,187,067 | 6/1965 | Beredjick | 260—877 |
| 3,234,196 | 2/1966 | Leavitt. | |

FOREIGN PATENTS

| | | |
|---|---|---|
| 1,111,390 | 7/1961 | Germany. |
| 872,532 | 7/1961 | Great Britain. |
| 1,151,660 | 7/1963 | Germany. |

OTHER REFERENCES

Kelley et al., Journal Amer. Chem. Soc., vol. 81, April 1959, pp. 1597–1600.

Morton et al., "Metalation of Polystyrene," 23 J. Org. Chem., pp. 1167–1168, August 1959.

MURRAY TILLMAN, Primary Examiner

K. E. KUFFNER, Assistant Examiner

U.S. Cl. X.R.

260—875, 877, 880, 886